Dec. 30, 1952 R. T. EVANS ET AL 2,623,341

AUTOMATIC LIFT FOR DISK HARROWS

Filed Oct. 3, 1947 6 Sheets-Sheet 1

INVENTORS:
RUSSELL T. EVANS
JOHN H. CLASEN
BY THEIR ATTORNEYS
HARRIS, KIECH, FOSTER & HARRIS,
BY Ward D. Foster Dec. 30, 1952 R. T. EVANS ET AL 2,623,341

AUTOMATIC LIFT FOR DISK HARROWS

Filed Oct. 3, 1947 6 Sheets-Sheet 2

INVENTORS:
RUSSELL T. EVANS
JOHN H. CLASEN
BY THEIR ATTORNEYS
HARRIS, KIECH, FOSTER & HARRIS
BY Ward D. Foster Dec. 30, 1952 R. T. EVANS ET AL 2,623,341

AUTOMATIC LIFT FOR DISK HARROWS.

Filed Oct. 3, 1947 6 Sheets-Sheet 3

INVENTORS:
RUSSELL T. EVANS
JOHN H. CLASEN
BY THEIR ATTORNEYS
HARRIS, KIECH, FOSTER & HARRIS
BY Ward D. Foster

AUTOMATIC LIFT FOR DISK HARROWS

Filed Oct. 3, 1947 6 Sheets-Sheet 4

INVENTORS:
RUSSELL T. EVANS
JOHN H. CLASEN
BY THEIR ATTORNEYS
HARRIS, KIECH, FOSTER & HARRIS,
BY Ward D. Foster Dec. 30, 1952 R. T. EVANS ET AL 2,623,341

AUTOMATIC LIFT FOR DISK HARROWS

Filed Oct. 3, 1947 6 Sheets-Sheet 5

INVENTORS:
RUSSELL T. EVANS
JOHN H. CLASEN
BY THEIR ATTORNEYS
HARRIS, KIECH, FOSTER & HARRIS,
BY Ward D. Foster

AUTOMATIC LIFT FOR DISK HARROWS

Filed Oct. 3, 1947 6 Sheets-Sheet 6

INVENTORS:
RUSSELL T. EVANS
JOHN H. CLASEN
BY THEIR ATTORNEYS
HARRIS, KIECH, FOSTER & HARRIS,
BY Ward D. Foster Patented Dec. 30, 1952

2,623,341

UNITED STATES PATENT OFFICE 2,623,341

AUTOMATIC LIFT FOR DISK HARROWS

Russell T. Evans and John H. Clasen,
Anaheim, Calif.

Application October 3, 1947, Serial No. 777,604

25 Claims. (Cl. 55—73)

This invention relates to earth working implements and more especially to those commonly known as disk plows and disk harrows which will be collectively designated herein as disk harrows.

Disk harrows conventionally comprise forward and rearward gangs of disks mounted in frames which diverge toward one side, thus throwing one corner of the forward gang well out in front so that, on attempting to turn the harrow toward the side of divergence, such forward corner tends to gouge into the earth and resist the turning movement. Commonly, such side is the right side and such structures will be here used for illustrative purposes, although it will be apparent that devices for left-hand turning may be as readily constructed.

One important object of this invention is to provide a disk harrow construction particularly adapted for easy turning without interference from a forwardly projecting corner.

Another object is to provide for lifting the disks to clear the soil for turning or for transport. It is also an object to provide for regulation of penetrations of the soil during disking.

A further object is to make lifting of the disks automatic, and it is a still further object to provide for adjusting such automatic lifting as well as to provide for adjustment by the driver of a tractive vehicle from his seat on such a vehicle.

Also, it is an object of this invention to provide a disk harrow having ground wheel means upon which to transfer at least a portion of the harrow weight when the aforesaid forward corner of the harrow is lifted from the earth, and a kindred object is to provide wheel means upon which the entire weight of the disking portions may be transferred as required during turning or for transport.

Other objects and the various features of the invention will become apparent to those skilled in this art upon reference to the following specification and accompanying drawings wherein certain embodiments are disclosed by way of illustration.

Figure 3:
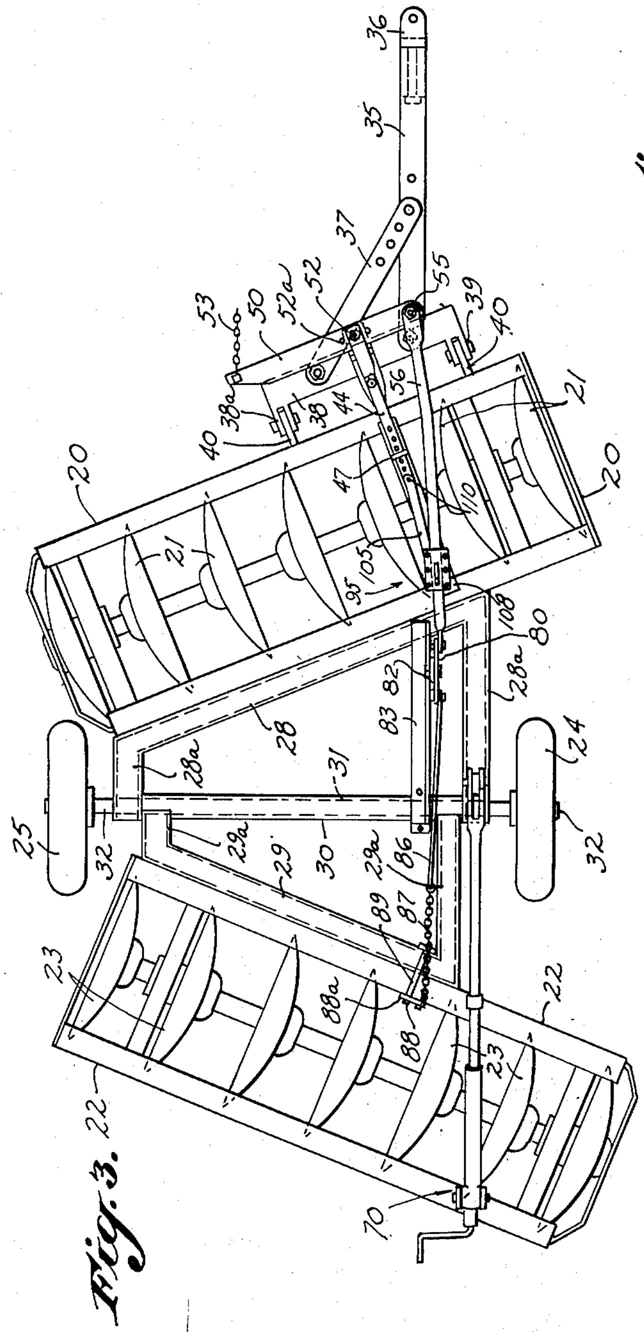
Fig. 3 is a plan view similar to that of Fig. 1 and showing the invention, in one form, applied to a second form of harrow construction.
Figure 4:
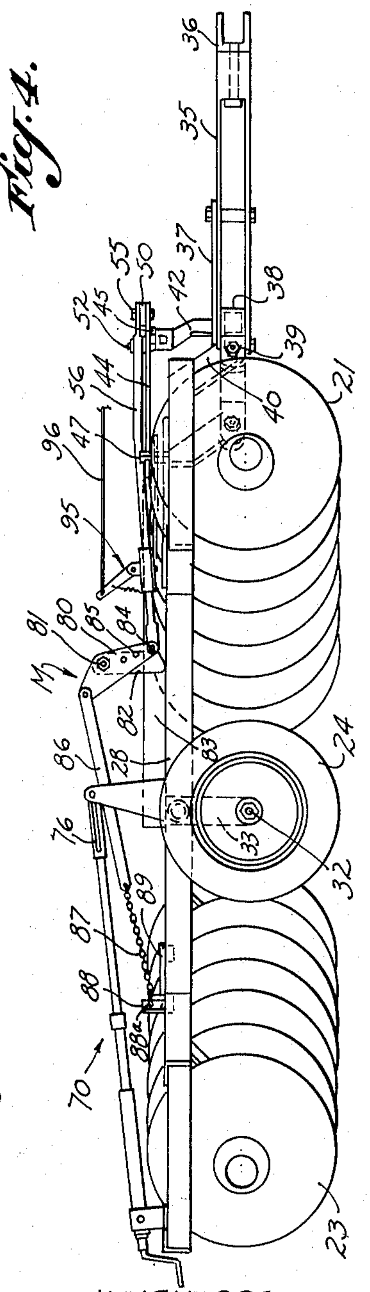
Fig. 4 is the side elevation of the structure shown in Fig. 3.
Figures 14, 15:
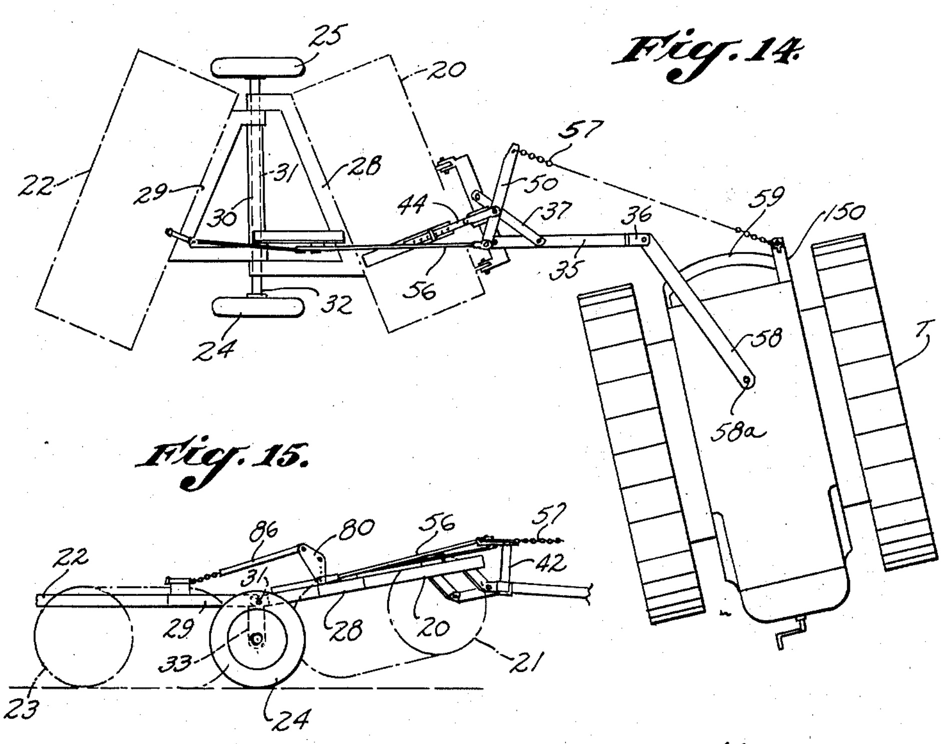
Fig. 14 is a diagrammatic plan view illustrating the method of actuation of the lifting means as automatically effected by a tractor making a right hand turn.
Fig. 15 is a side elevation indicating a first stage of the operation of Fig. 14 to lift the forward disks for turning toward the right.
Figure 16:
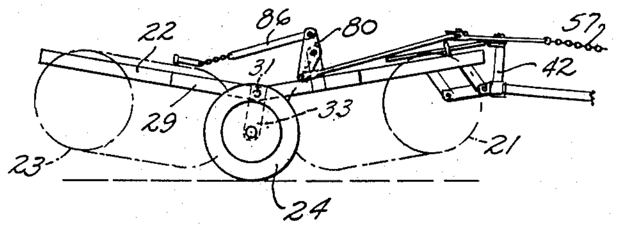
Figure 17:
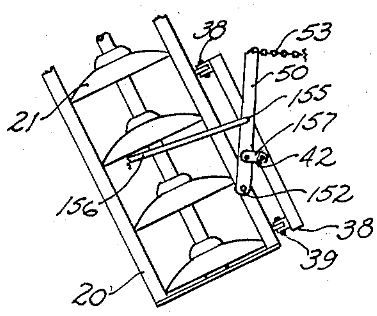

Fig. 16 is an elevation similar in some respects to that of Fig. 15 but indicating also the elevation of the rearward gang of disks whereby the harrow is placed in transport position, the harrow being that of the horizontal hinge type illustrated in Figs. 3 and 4, and also in Figs. 5, 6, 12 and 13; and Fig. 17 is a fragmentary plan view indicating a possible modification of the mounting and the connection of the draft actuated lever which is directly operated by the tractor as indicated in Fig. 14.

Figures 1, 2:
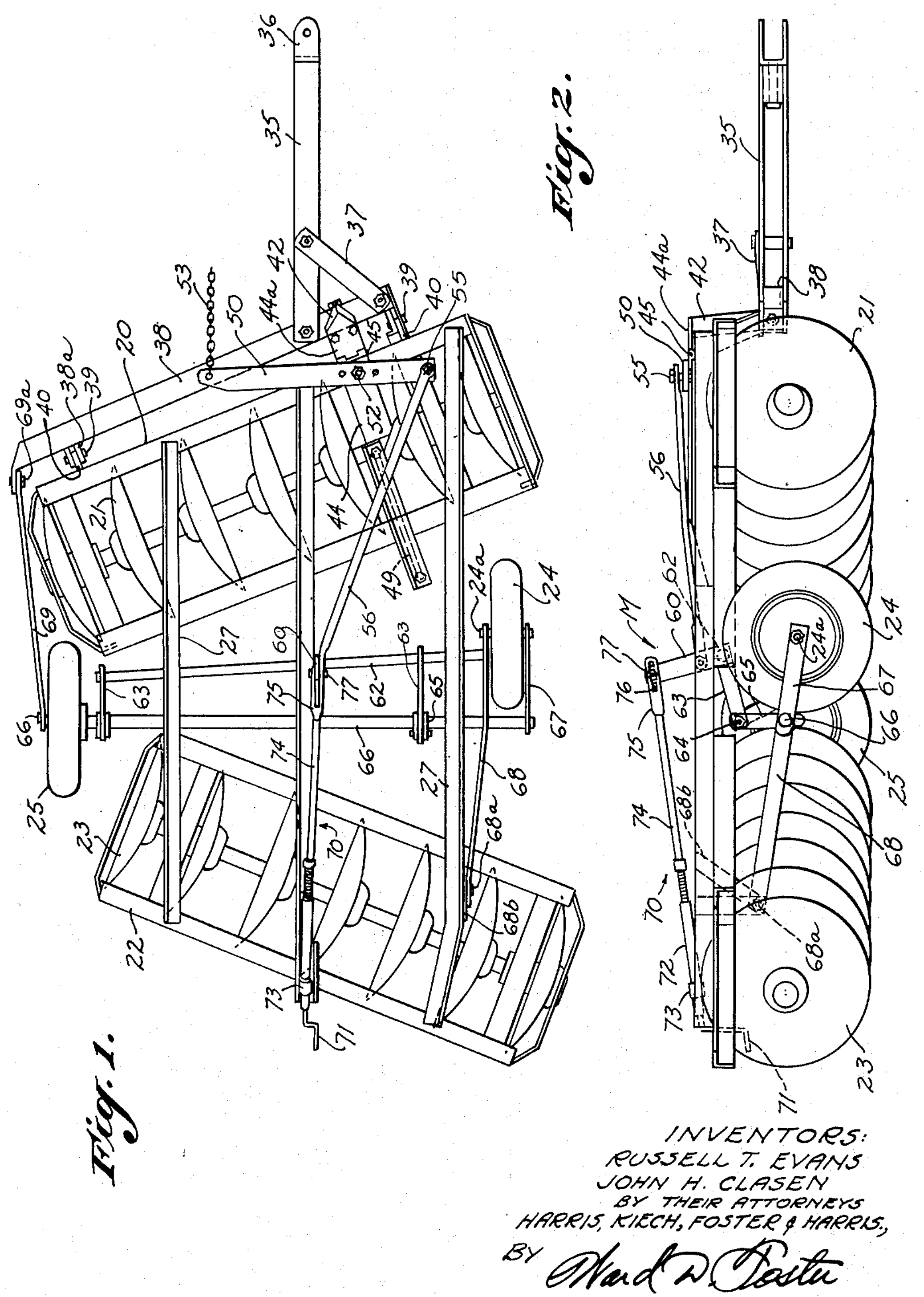
Fig. 1 is a plan view showing the improvements of this invention applied to one form of harrow construction.
Fig. 2 is a side elevation of the form shown in Fig. 1.

Both in the form of construction illustrated in Figs. 1 and 2 and in the second form of construction illustrated in the other figures, particularly in Figs. 3 and 4, the disk harrows upon which the invention is applied comprise, in each case, a front frame 20 of substantially rectangular form conveniently constructed from angle iron, such frame carrying a conventional series of forward disks 21, and a rear frame 22 constructed like the frame 20 and provided with a rearward series of disks 23. These frames 20 and 22 and their disks are arranged to converge conventionally toward one side, the arrangement illustrated showing the divergence toward the right side. In each instance a right ground wheel 24 is employed together with a left ground wheel 25.

In the form of Figs. 1 and 2, the front frame 20 and the rear frame 22 are rigidly connected together by longitudinally extending connecting rails 27, the form illustrated providing a left rail, a center rail, and a right rail. In the form of Figs. 3 and 4, the front frame 20 is hingedly connected with the rear frame 22. This is accomplished through the medium of a framework 28 having a forward bar bolted or otherwise secured to the rearward member of the frame 20 and a framework 29 similarly secured to the forward member of the frame 22. End members 28*a* of the framework 28 are of different lengths and the end members 29*a* of the framework 29 are similarly of different lengths whereby to provide for the required divergence of the frames 20 and 22 of these so-called offset disk harrows. The end members 29*a* are secured, as by welding, to a sleeve 30 which houses a shaft 31 upon which the end members 28*a* of the framework 28 are mounted. In this manner a horizontal transverse hinge is provided by which the front and rear frames 20 and 22 are pivotally connected for upward movement with respect to the ground wheels 24 and 25. These wheels 24 and 25 are mounted upon an axle 32 which is mounted in the lower ends of upright standards 33 welded to the under sides of the end members 28*a* of the forward framework 28. The mounting of the wheels 24 and 25 of the form of Figs. 1 and 2 will be presently described.

In connection with both of the constructions shown in Figs. 1 to 4, a conventional tongue 35 which may be provided with a conventional swiveled forward connecting device 36 may be used, any bracing means 37 also being employed. The rearward ends of the tongue 35 and the bracing means 37 are attached to a transversely disposed drawbar 38 which is connected at its right end and also toward its left end by pivots 39 passed through ears 38*a* on the drawbar 38 and through the lower ends of hangers 40 rigidly attached to and depending from the adjacent forward member of the frame 20. As illustrated, the drawbar 38 assumes the same angularity as the frame 20. It is conveniently of box construction, somewhat as indicated, the tongue 35 and the bracing means 37 being conveniently of strap iron or the like.

Upstanding from an intermediate portion of the drawbar 38 is a riser 42 fixedly secured at its lower end as by welding to the upper face of the drawbar 38. This riser 42 may be of box construction or of angular shape in cross section so long as it provides suitable resistance to bending or other deformation under the conditions of use. The upper end of the riser 42 has secured thereto the forward end of a slide bar 44 which may be of somewhat variable construction, but in any case includes a hinge connection 45 with the upper end of the riser 42. As illustrated in Fig. 4, the hinge connection 45 may connect the top of the riser 42 and the under side of the slide bar 44. However, as indicated in Fig. 1, the hinge connection 45 may connect the slide bar 44 and a forward extension 44*a* thereof, the front of the extension 44*a* being rigidly secured to the upper end of the riser 42 as by bolts or welding.

Figures 5, 6:
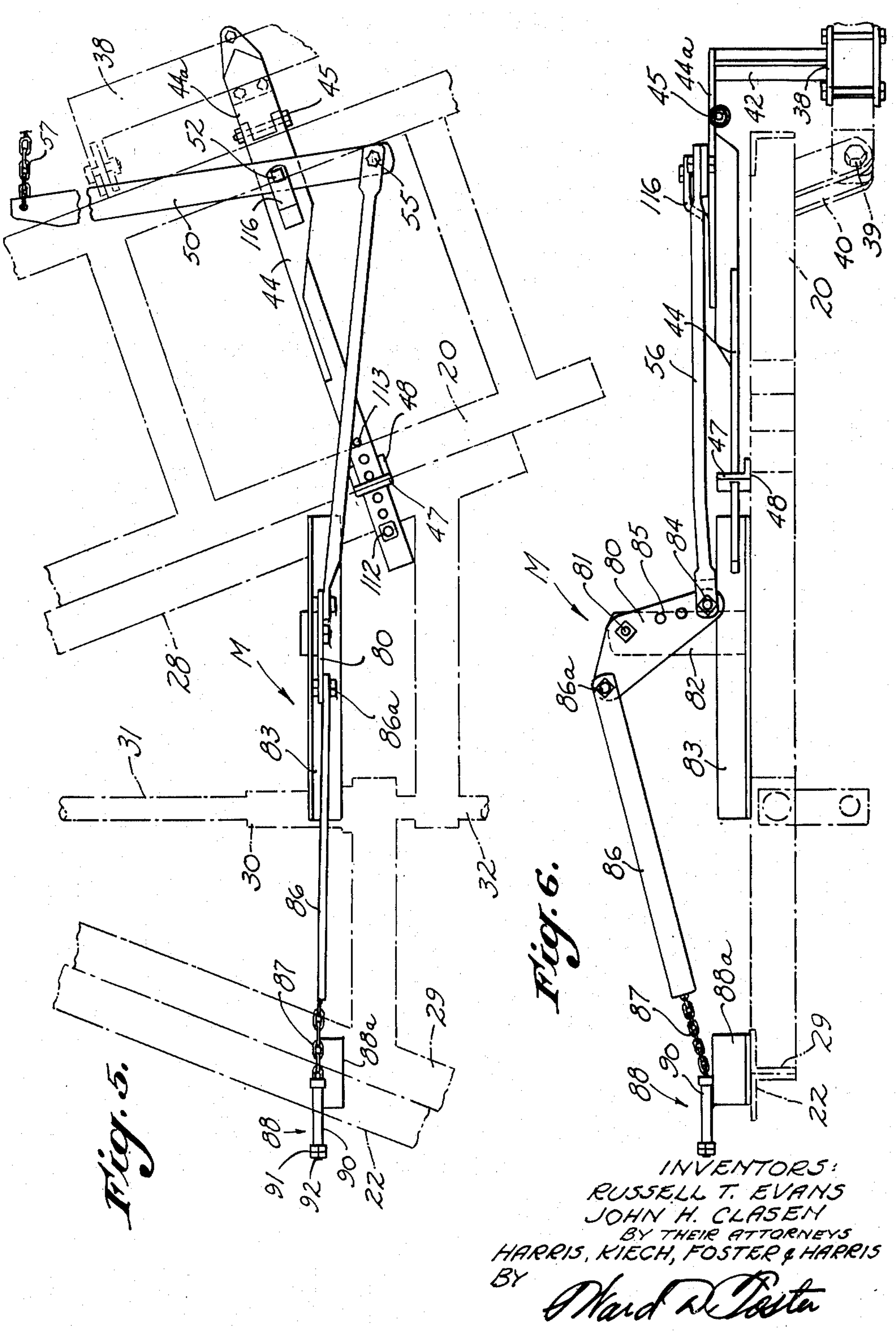
Fig. 5 is a fragmentary plan view on an enlarged scale showing a somewhat simplified form of the actuating means disclosed in Fig. 3.
Fig. 6 is a side elevation of the same scale of the structure of Fig. 5.
Figures 12, 13:
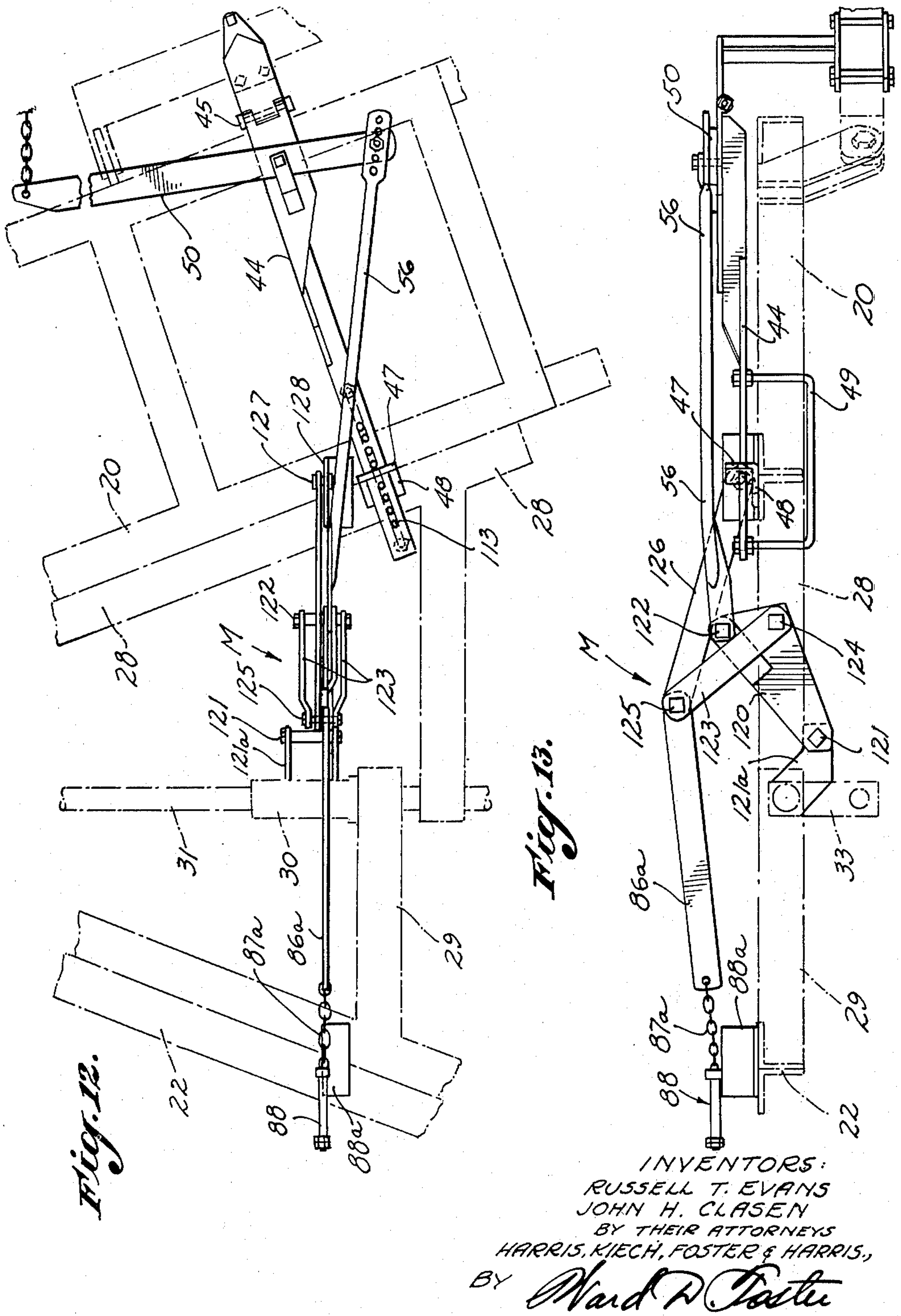
Fig. 12 is a fragmentary plan view of a somewhat modified form of mechanism seen in Fig. 1 but adapted to the harrow construction of Figs. 3 and 4 having the horizontal hinge connection between the harrow frames.
Fig. 13 is a side elevation of the structure shown in Fig. 12.

In either instance the slide bar 44 is slidably movable upon the front frame 20 as by being passed through an eye 47 suitably secured to any adjacent portion of the frame 20 somewhat as indicated in any of Figs. 4, 5, 6, and 9, and which may include a bracket 48 as seen in Figs. 5 and 6. Or the slidable connection may be effected as indicated in Figs. 1, 10 and 13, where an elongated U-bolt 49 is connected with the rearmost portion of the slide bar 44 to underlie and span adjacent portions of the frame 20 and framework 28, as the case may be. This constrution may also include the eye 47 as indicated in Fig. 13.

Upon a forward portion of the slide bar 44 a draft actuated lever 50 is fulcrumed as by means of a bolt 52 or other form of pivot. In the form of Figs. 1 and 2 the bolt 52 lies behind the hinge connection 45, and in the form of Figs. 3 and 4 the fulcrum bolt 52 is mounted in the forward extremity of the slide bar 44. It will be observed that this mounting is adjacent the top of the riser 42 and hence will lie above the level of the pivots 39 by which the drawbar 38 is attached to the lower ends of the hangers 40.

The left end of the draft actuated lever 50 has a draft chain 53, or other appropriate draft line, attached thereto, this chain or line extending forward for automatic actuation by a tractive vehicle somewhat as indicated in Fig. 14. The opposite end of the lever 50 is connected by a pivot bolt 55 to a push rod 56, whereby to actuate various frame lifting mechanisms generally indicated in the various figures at M, each of which will be individually described. Such mechanisms M serve to elevate the front frame 20 and its disks 21 with respect to the ground wheels 24 and 25 and with respect to the ground or roadway, and also, at times, to elevate the rear frame 22 and its disks 23 as required and in accordance with the setting of the various parts. The actuation of such means will vary as between the construction of Figs. 1 and 2 and the construction of Figs. 3 and 4 and similar arrangement. In such a device as that shown in Figs. 3 and 4, the frames 20 and 22 are swung upward about the horizontal hinge provided by the sleeve 30 and the shaft 31, whereas in the form of Figs. 1 and 2 the entire frame structure provided by the front and rear frames 20 and 22 and the connecting rails 27 is moved as a unit with respect to the ground wheels 24 and 25, whereby to shift the front disks 21 and the rear disks 23 accordingly.

In connection with the operation of the draft actuated lever 50 for the purpose of elevating the foremost disks 21 and the other disks as may be required, it will be observed that both of the pivots provided by the fulcrum bolt 52 and the pivot bolt 55, by which the right end of the lever 50 is attached to the push rod 56, are to some extent floating with respect to the frame 20. Thus, there is a tendency, when forward draft is applied to the draft chain 53, for the fulcrum bolt 52 to be pulled forward with respect to the front frame 20 thus to shift the fulcrum bolt 52. Such movement acts to push forward the top of the riser 42 thereby to produce a spread between the upper part of the riser 42 and the adjacent portion of the frame 20. Such spread can take place only about the pivots 39 by which the draw bar 38 is hinged upon the lower ends of the depending rigid hangers 40. In order that such spread may occur it is necessarily accompanied by an elevation of the pivots 39, and hence of connected parts including the disks 21. This result arises because the forward end of the tongue 35 is maintained in elevated position by reason of attachment of the swivel connecting device 36 to the rear end of a drag link 58 (Fig. 14) connected with a tractor T, the outer end of the drag link 58 being held in elevated position by a horizontal quadrant bar 59 carried by the tractor. Since the forward end of the tongue 35 cannot drop, nor can the rearward disks 23 of the harrow, any spread between the frame 20 and the riser 42 produces elevation of the disks 21 as illustrated in Fig. 15.

The described spread between the upper end of the riser 42 and the adjacent portion of the frame 20 actually takes place when the draft actuated lever 50 is operated by the draft chain 53, because rearward shift of the pivot bolt 55 which connects the right end of the lever 50 to the push rod 56 is materially resisted by the inertia of the entire framework in the form of Fig. 1 and the inertia of the rear frame 22 and its disks 23 in the form of Figs. 3 and 4. Thus, part of the force supplied by the chain 53 results in forward movement of the fulcrum bolt 52 and part of it produces rearward movement of the push bar 56 to effect the required lifting action through the medium of the respective frame lifting mechanism M.

The proportionate application of these forces to accomplish the required effects is easily produced by adjusting the effective length of the lever arm between the fulcrum bolt 52 and the pivot bolt 55. Such adjustment may be accomplished through the medium of a series of holes as shown for selective reception of the bolt 52, or through a similar series of holes at the right end of the lever 50 for selective reception of the pivot bolt 55. Such adjustments will vary in accordance with the relative weights of the structures and according to whether the rigid framework of Fig. 1 is employed or the horizontally hinged structure of Fig. 3 is employed.

Respecting the specific construction of the frame lifting mechanism M of Figs. 1 and 2, the rearward end of the push rod 56 is pivotally attached to a crank arm 60 of a bell crank device which comprises a transversely disposed rock shaft 62 to which the lower end of the arm 60 is affixed as by welding so that the crank arm 60 projects upward. Also fixedly secured to the rock shaft 62 are rearwardly directed crank arms 63 which are adapted to be forced downward with respect to the adjacent framework including the connecting rails 27. The rearward ends of the crank arms 63 are pivotally connected at 64 with actuating links 65 appropriately connected with an axle 66 carrying the ground wheel 25 and also carrying arms 67 and 68 which carry a stub axle 24*a* for the ground wheel 24. The arm 68 is pivotally attached at 68*a* to a rearward portion of one of the connecting rails 27 (as by bracket means 68*b*), which arrangement both positions the wheel 24 in a longitudinal direction and permits its movement with respect to the framework. At the opposite end of the axle 66, an arm 69 similar to the arm 68, has its rearward end attached to the adjacent end of the axle 66 and has its forward end pivotally attached at 69*a* so as to position the left ground wheel 25 longitudinally while permitting relative vertical movement. As illustrated, such pivot is carried by the left end of the draw bar 38, but obviously might be carried by the adjacent end of the front frame 20.

From the foregoing, it will be apparent that, as draft upon the chain 53 actuates the lever 50 and the push rod 56, rearward movement of the upper end of the upstanding crank arm 60 will cause relative depression of the crank arms 63, the links 65, and the ground wheels 24 and 25. As a consequence, the forward portion of the entire framework including the foremost disks 21 will be elevated in conjunction with the spread concurrently produced between the upper end of the riser 42 and the adjacent portion of the frame 20. Thus, the foremost disks 21 are caused to clear the soil in order to facilitate a right hand turn. To provide for a maintained elevation so that the harrow may be transported from place to place, a conventional jack screw device 70 may be employed. This includes a crank 71 connected to actuate an internally threaded sleeve 72 working in a trunnion 73 carried by the rear member of the rear frame 22. The threaded sleeve 72 receives the threaded end of a screw shaft 74 having at its forward end a forked connection 75 having a slot 76 providing lost motion for a pivot bolt 77 in the upper end of the upstanding crank arm 60, whereby to permit independent movement of the crank arm 60 under the thrust of the push rod 56.

When employing the harrow construction shown in Figs. 3 and 4 and in the following figures, the push rod 56 serves to swing the front frame 20 and the rear frame 22 relative to each other about the horizontal hinge defined by the shaft 31, whereby to aid or effect elevation of at least one of these frames so that relative positions will be established either as shown in Fig. 15 or as shown in Fig. 16, as conditions may require. Taking the lifting mechanism M of Figs. 3 and 4 as illustrative, the push rod 56 has its rearward end adjustably connected to a rocking lever 80 disposed in a vertical plane and fulcrumed as by a bolt 81 upon the upper end of a vertically extending standard 82 affixed to any framework member 83 rigidly carried upon the forward framework 28, or upon the forward frame 20, as disclosed. A pivot pin 84 serves to attach the push rod 56 to the lever 80, and the point of attachment may be adjusted by means of holes 85 in the lower end of the lever 80 in which the pivot pin 84 is selectively positioned. Actuation of the lever 80 by the push rod 56 places draft upon a pull bar 86 whose rearward end is shown as being attached at its rear end, either adjustably or fixedly, to the rearward framework 29 and the rear frame 22, or to either of these, as by any attachment means generally indicated at 88 which may include bracket means 80*a* and an attachment bolt 89 as desired. This particular portion of the mechanism is seen in greater detail in Figs. 5, 6, and 7 where the forward end of the pull bar 86 is shown as pivotally connected to the upper end of the rocking lever 80 by a bolt 86*a*, and a modified form of attachment means 88 is shown as including a sleeve 90 rigidly secured upon the bracket means 80*a*. In this form the chain 87 enters the sleeve 90 and is adjustable therein through the medium of nuts 91 on a bolt 92, the latter being affixed to the end of the chain and being held against the rearward end of the sleeve 90 by means of the nuts which may be set to retain the bolt 92 in any adjusted position, and hence set the rocking lever 80 in such angular position as required.

Figures 7, 8, 9, 10, 11:
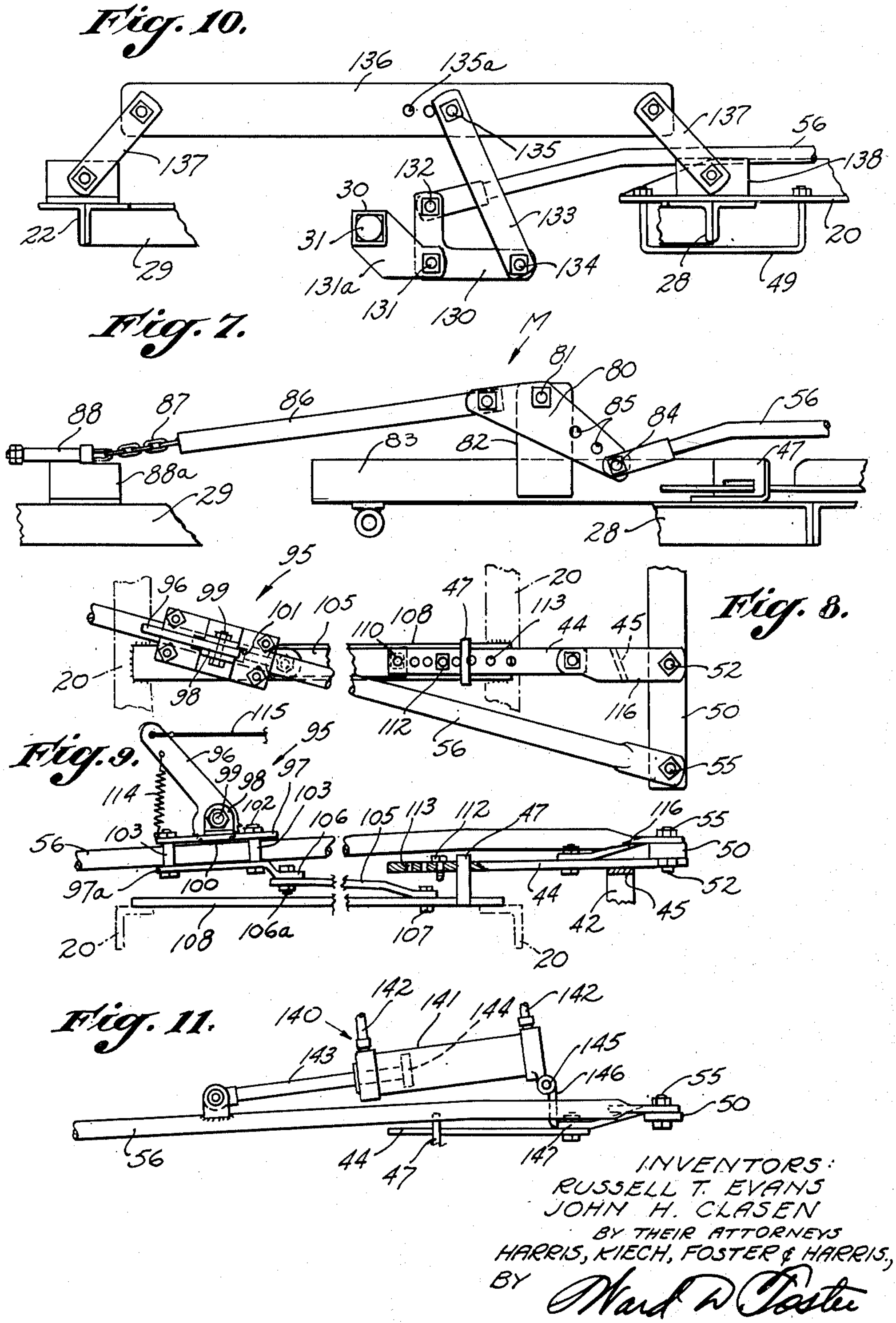
Fig. 7 is a side elevation similar to that of Fig. 6, but showing the parts in a different position.
Fig. 8 is a plan view showing a slight modification of the actuating mechanism of Figs. 3 and 4.
Fig. 9 is a side elevation of the structure shown in Fig. 8.
Figs. 10 and 11 are side elevations showing further modified forms of actuating mechanism.

In order that the harrow construction of Figs. 3 and 4 may be locked in such elevated positions as illustrated in Figs. 15 and 16 through means controlled by the driver of the tractive vehicle pulling the harrow, a friction lock generally indicated at 95 is employed. The construction of this lock is best illustrated in Figs. 8 and 9. It comprises a movable locking arm 96 upstanding from the push rod 56, the arm 96 being pivoted on a slidable plate 97 through the medium of two ears 98 welded to the upper surface of the plate 97 and a transverse pivot bolt 99 passed through the ears 98 and the lower end of the arm 96. The lower extremity of the arm 96 is provided with an eccentrically positioned knurled or toothed friction grip section 100 which projects through a slot 101 in the plate 97 for engagement with the upper surface of the push rod 56 when in the locking position illustrated in Fig. 9. The plate 97 cooperates with a lower plate 97*a* to which it is bound through the medium of bolts 102 passing through spacer sleeves 103. Thus, the push rod 56 may slide to and fro between the plates 97 and 97*a* and between the respective spacers 103 and their bolts 102 when the arm 96 is shifted to a position opposite to that shown. However, when the arm 96 is in the position shown, movement of the push rod 56 toward the right between the plates 97 and 97*a* is prevented by reason of the grip section 100. The plates 97 and 97*a* and the locking arm 96 are held in appropriate position through the medium of a positioning arm 105 whose left end, as seen in Figs. 8 and 9, is pivotally secured to any appropriate extension 106 on the lower plate 97*a* by a pivot bolt 106*a*. The forward end of the arm 105 may be bolted or otherwise appropriately secured as by a pivot bolt 107 to a crossbar 108 suitably fixed upon adjacent portions of the front frame 29, as indicated in Fig. 9. However, it is ordinarily preferred to attach the forward end of the positioning arm 105 to the rearward end of the adjacent slide bar 44 as seen in Fig. 8, this being accomplished by means of a bolt 110. Thus, with the construction of Fig. 9, the friction lock 95 will have no movement in the direction of the length of the push rod 56, but may have such slight pivoting movement about the points of attachment of the ends of the positioning arm 105 as is necessitated by any lateral movement which may occur in any adjacent portion of the push rod 56. However, with the construction of Fig. 8, the friction lock 95 may have such movement in the general direction of the length of the push rod 56 as may be imparted to the slide bar 44, any lateral movement of the lock 95 with respect to the slide bar 44 being permitted by a corresponding swinging action of the positioning arm 105 about the bolt 110 and the pivot bolt 106*a*.

With respect to the movement of the slide bar 44 of Figs. 3 and 4, which is in general the same as the movement of the slide bar 44 of Figs. 1 and 2, its rearward end is shown as being guided through an eye 47 whose lower extremity is secured to an adjacent end portion of the crossbar 108. In such instances where any form of eye 47 is employed with the slide bar 44, the forward movement of the slide bar 44 under influence of the movement of the draft actuated lever 50, when draft is applied through the chain 53, may be limited by a stop pin 112 which is dropped selectively into any one of a plurality of holes 113 in the rearward end of the slide bar 44, so that the stop pin 112 (which may be in the form of a short bolt) will strike against the eye 47 and limit movement of the bar 44. When desired to limit or prevent return movement of the slide bar 44, as when it is desired that the spread position of the riser 42 be maintained as illustrated in Figs. 15 and 16, a stop pin 112 may be dropped into one of the holes 113 in front of the eye 47. It will be understood that such an eye 47 will be in the form of a strong strap member or bracket, as variously illustrated in different figures and sufficiently strong for the purpose. Thus, when the stop pin 112 illustrated in Fig. 8 is placed to limit forward movement of the slide bar 44, the locking arm 96 being in the locking position illustrated in Fig. 9, the friction lock 95 and the push rod 56 can travel no further forward than permitted by the stop pin 112 and the eye 47. Under some circumstances this may be desirable for the purpose of limiting spread between the upper end of the riser 42 (Figs. 15 and 16) and the upper portion of the front frame 29. However, when there is no occasion for so positively limiting such spread, the stop pin 112 need not be employed, and the forward movement of the friction lock 95 and the push rod 96 is limited by the amount of spreading movement which can take place between the riser 42 and the front frame 29. Proper binding action of the grip section 100 upon the push rod 56 is insured by a spring 114 attached at one end to the plate 97 and at the other end to the arm 96. The arm 96 is adapted to be pulled forward by the driver of the tractor through the medium of a cable 115 extending from the top of the arm 96 to a point on the tractor adjacent the driver's seat. If desired, the arm 96 may be so arranged that the spring 114 will pass dead center represented by the pivot bolt 99 whereby to hold the arm 96 in inoperative position. A jerk by the driver upon the cable 115 will ordinarily be sufficient to jar the arm 96 to carry the spring over such dead center whereby to restore the arm 96 to locking position.

As illustrated at the right of Figs. 8 and 9, the forward end of the slide bar 44 may have secured thereto an overhanging reinforcing bracket 116 which provides a positive brace for the upper end of the fulcrum bolt 52 which mounts the draft actuated lever 50. Such bolt bracing bracket 116 preferably may be used in all forms, and, if desired, a similar arrangement may be provided for the pivot bolt 55 at the right end of the lever 50.

In the form of lifting mechanism illustrated in Figs. 5 and 6, the friction lock 95 is omitted, and the rear end of the slide bar 44 extends through an eye 47 carried on a bracket 48 welded directly upon the front frame 29. In this particular form the slide bar 44 is shown as of irregular configuration, its forward portion being constructed from a piece of angle iron welded to a rear strap section provided with a series of holes 113 adapted to receive stop pins 112. Also, in this form, the hinge connection 45 is shown as being located between the slide bar 44 and its extension 44*a*, as in the construction of Figs. 1 and 2, the forward extremity of the extension 44*a* being fixedly secured to the top of the riser 42.

With reference to the form of lifting mechanism M shown in Figs. 12 and 13, the arrangement of the slide bar 44, the push rod 56, the draft actuated lever 50 and hinge connection 45 is substantially the same as that of Figs. 5 and 6 including the location of the eye 47 and the employment of the holes 113 to receive the stop pin 112. In this construction there is employed an elongated underlying U-bolt 49 like that in Fig. 10, the rearward leg of the U-bolt 49 serving to limit forward movement of the slide bar 44 by striking the adjacent edge of the forward framework 28 supporting the front frame 29.

Figs. 12 and 13 illustrate a modified form of lifting mechanism M actuated by the push rod 56. This comprises a bell crank 120 in the form of a plate whose lower end is pivoted at 121 on a bracket 121a carried on the sleeve 30 of the horizontal hinge which also includes the shaft 31. The push rod 56 is pivotally attached at 122 to the upper corner of the bell crank 120. At the lower right corner of the bell crank 120 an actuating link 123 is attached as by a pivot bolt 124, this link 123 being of double bar formation as seen in Fig. 12. The upper end of the link 123 is pivotally attached by an appropriate pivot pin 125 to the forward end of a rear pull bar 86a attached by a chain 87a to an attachment means 88 like that shown in Figs. 5, 6, and 7. The pivot pin 125 also receives the rearward end of a forward pull bar 126 whose forward end is pivoted at 127 to a bracket 128 carried on the framework 28 and the front frame 20. With this construction, thrust of the push rod 56 through the operation of the draft actuated lever 50 causes elevation of the upper end of the link 123 and of the pivot pin 125 so that the consequent elevation of the adjacent ends of the pull bars 86a and 126 causes relative swinging movement of the front and rear frame structures about the horizontal hinge 30, 31, thereby effecting an elevation of one or both of the respective gangs of disks, whereby to attain such positions as illustrated in Figs. 15 and 16.

In Fig. 10 there is illustrated a structure which operates similarly to the structure of Figs. 12 and 13. Here the push rod 56 is attached to a bell crank 130 pivoted at 131 upon a bracket 131a carried on the sleeve 30, the rearward end of the push rod 56 being pivotally attached at 132 to the upper end of the bell crank 130. The other end of the bell crank 130 has a lifting link 133 attached thereto by means of a pivot bolt 134, and the upper end of the lifting link 133 is pivotally attached by a pivot bolt 135 to a transverse lifting beam 136 whose opposite ends are pivotally attached to elevating links 137 which are in turn pivotally attached to brackets 138 respectively secured to the forward framework 28 and the front frame 20 and to the rearward framework 29 and the rear frame 22. Thus, elevation of the upper end of the lifting link 133 through the action of the push rod 56 and the bell crank 130 produces swinging movement of the front and rear frameworks about the horizontal hinge 30, 31 similar to that produced by the means of Figs. 12 and 13. Proportionate effects produced through the two elevating links may be varied by selectively positioning the pivot bolt 135 in any one of a plurality of holes 135a in the beam 136.

In Fig. 11 there is illustrated a hydraulic jack 140 comprising a cylinder 141 supplied by oil lines 142, there being a piston rod 143 which carries within the cylinder a conventional piston 144. The outer end of the piston rod 143 is fixed upon a portion of the push rod 56 and the forward end of the cylinder 141 is attached to the corresponding slide bar 44 by means of a hinge connection 145 and a bracket 146 attached to the forward end of the slide bar 44 by means of a pivot bolt 147. The forward end of the bracket 146 is pivotally connected with the draft actuated lever 50 in any manner disclosed in the other forms for the bar 44.

*Operation*

The operation of the lifting mechanism of the present invention has in general been outlined above in connection with the description of the various forms. For the most part, the operation is automatic and is produced by the turning of the tractor T as indicated in Fig. 14. To accomplish operation, the draft chain 53, whose rear end is attached to the left end of the actuating lever 50, has its forward end attached to a lug 150 which is fixed at the left side of the rear end of the tractor. The lug 150 may have an irregular opening 151 through which the links of the chain may be passed and adjustably held to produce the required actuation. With the forms of the invention illustrated, when the tractor T makes a right hand turn the distance between the portion of the front frame 20 adjacent the left end of the actuating lever 50 and the attachment lug 150 increases with respect to the effective length of the draft tongue 35 and the drag link 58. Thus, the left end of the actuating lever 50 is drawn forward accordingly, such movement becoming greater as the radius of turn reduces and the turning movement becomes sharper. This may become more pronounced where, as in the construction illustrated, the drag link 58 swings on the quadrant bar 59 about a pivot 58a positioned on the median line of the tractor somewhat forward of the attachment lug 150.

As rather fully explained in connection with the description of Figs. 1 and 2 above, the action of the draft chain 53 to swing the actuating lever 50 upon its fulcrum bolt 52 causes the push rod 56 attached to the right end of the lever 50 by the pivot bolt 55 to be forced rearward, the slide bar 44 and the fulcrum bolt 52 being at the same time forced somewhat forward to cause the hinging action about the pivot 39 between the riser 42 and adjacent forward portion of the front frame 20. The resultant spread between the upper end of the riser 42 and the frame 20 results in the described elevation of the foremost portion of the frame 20 and the respective disks 21, such movement necessarily resulting because the forward end of the tongue 35 is held in an elevated position by the quadrant bar 59. In the form of Figs. 1 and 2, such rearward movement of the push rod 56 actuates the bell crank mechanism 60, 63 to raise the harrow framework with respect to the ground wheels 24 and 25.

In the case of the form illustrated in Figs. 3 and 4 and similar figures, the rearward motion of the push rod 56 actuates the rocking lever 80 of the lifting mechanism M to place a draft upon the pull bar 86 and the pull chain 87 whereby to cause a swinging movement of the front and rear frames 20 and 22 with respect to each other about the horizontal hinge of the sleeve 30 and the shaft 31 therein. Depending upon the total effect of the above described movements and the turning radius of the tractor T, the front frame 20 and its disks 21 may be elevated only as indicated in Fig. 15. However, in the case of greater movement by the draft chain 53, the effects may be great enough to lift both the foremost disks 21 and the rearmost disks 23 to completely clear the soil being worked and to place all of the weight upon the ground wheels 24 and 25. As heretofore indicated, the proportional effects resulting from the relative spreading movement between the top of the riser 42 and the front frame 20 and the thrust of the push rod 56 may be varied as required by shifting the fulcrum bolt 52 or the pivot bolt 55 in corresponding holes provided in the lever 50. Similar regulation may be effected, if desired, by shifting the pivotal mounting of the rear end of the push rod 56 in the holes in the lower end of the rocking lever 80 (Figs. 3 to 7), or otherwise in some forms, such as by shifting the point of attachment of the elevating links to the lifting beam 136 as seen in Fig. 10. Again, forward movement of the slide bar and of the fulcrum bolt 52, may be limited by employment of a stop pin 112 positioned in one of the holes 113 in the respective slide bar 44, whereby to engage the respective eye 47 after predetermined forward movement. It will be appreciated that another stop pin 112 may be used on the forward side of the eye 47 in any instance to limit return of the respective slide bar 44, whereby to prevent reduction of the spread between the top of the riser 42 and the adjacent portion of the front frame 20, should such a condition be desired at any time for the purpose of transport or otherwise.

Maintenance of the elevation of either or both of the front and rear frames 20 and 22, as for the purpose of transport, may be accomplished by the jack screws 70 as shown in Figs. 1 to 4 and other figures. Also, such maintenance may be accomplished by means of the friction lock 95 shown in Figs. 3, 4, 8, and 9 particularly, the gripping portion 100 eccentrically provided on the lower end of the locking arm 96 acting to bind the push rod 56 in the friction grip 95.

Various modifications of the generic invention herein disclosed will become apparent to those skilled in this art, for example, a simplification useful in some instances is illustrated in Fig. 17. Here the right end of the actuating lever 50 which is operated by the same draft chain 53 as indicated in Fig. 14 is mounted directly upon the forward member of the front frame 20 by means of a fixed fulcrum bolt 152; the push rod 56 of the other form is replaced by a pull rod 156 which is appropriately attached to an intermediate portion of the lever 50 by a pivot bolt 155. The pull rod 156 is then suitably attached at its rear end to the rear frame 22 of the form of Figs. 3 and 4 and similar forms, or to appropriate bell crank mechanism suitably arranged for the purpose when applied to the form of Figs. 1 and 2, or to other bell crank forms such as that shown in Fig. 10. For the purpose of producing the required spread between the top of the riser 42 on the draw bar 38 and the adjacent forward portion of the front frame 20, a link 157 is provided which projects forward from a suitable point on the draft actuated lever 50, the rearward end of this link 157 being pivoted upon the lever 50 at a point in the vicinity of the fulcrum bolt 152, and the forward end of the link 157 being pivotally attached to the top of the riser 42.

Other variations will, no doubt, become apparent to workers in this art and it is intended therefore to project all such modifications as may fall within the scope of the claims.

We claim as our invention:

1. In combination in a disk harrow: a front frame carrying a forward gang of disks; a rear frame carrying a rearward gang of disks and operatively connected with said front frame in diverging relation to provide on the side of divergence a foremost portion of said front frame and its associated disks; wheel means connected with said frames and with respect to which said frames are adapted to be raised and lowered; movable draft-actuated means carried by said front frame; and actuating means connected with and operated by said draft-actuated means and providing operative connection between said frames and said wheel means, said actuating means including arm means pivoted with respect to one of said frames, link means connecting said draft-actuated means with said arm means, and linkage means connecting said arm means with said rear frame whereby said link means, said arm means and said linkage means act to cause elevation of said foremost portion of said front frame upon application of forward draft to said draft-actuated means.

2. A combination as in claim 1 including: a draw bar pivotally mounted on said front frame; tongue means attached to said draw bar to pull said harrow through said draw bar; upstanding means fixed on said draw bar; and means pivotally mounting a portion of said draft-actuated means on said upstanding means above the pivotal mounting of said draw bar on said front frame.

3. A combination as in claim 2 wherein said means pivotally mounting a portion of said draft-actuated means on said upstanding means includes a slide bar slidably mounted on said front frame and connected with said upstanding means to guide movement of said portion of said draft-actuated means.

4. A combination as in claim 1 wherein said link means is a thrust rod.

5. A combination as in claim 1 wherein said arm means is pivoted directly upon said one of said frames.

6. In combination in a cultivating construction: rearward and forward frame means carrying earth-working tools; movable draft-actuated lever means on the forward frame means; actuating means connected with and operated by said draft-actuated lever means to elevate the forward portion of the forward frame means with respect to the rearward frame means, said actuating means including arm means pivotally mounted with respect to one of said frame means, an actuating link connecting said arm means to said lever means, and linkage means connecting said arm means to said rearward frame means, whereby said link, arm means and linkage means serve to cause elevation of the forward frame means with respect to the rearward frame means upon the application of forward draft to said draft-actuated means; and tongue means connected to said forward frame means for attachment to a tractive vehicle.

7. A combination as in claim 6 including ground wheels supporting said frame means, and operating means connecting said actuating means with said wheels whereby movement of said lever means actuates said operating means to move said wheels relative to one of said frame means to elevate one of said frame means with respect to said wheels.

8. A combination as in claim 7 including: a draw bar pivotally attached forwardly of the forward frame means, said tongue means being mounted on said draw bar for attachment to a middle portion of the tractive vehicle; and draft means attached at one end to said lever means and attachable at its other end to one side of the tractive vehicle to pull and swing said lever means when said vehicle turns.

9. A combination as in claim 6 including: a draw bar pivotally attached to a forward portion of the forward frame means; a riser on said draw bar above the pivotal attachment of said draw bar to said frame means, said lever means having connection with the top of said riser to tip the latter forward through movement of said lever means upon pull by said draft means.

10. A combination as in claim 9 including lock means connected to one of said frame means in position to engage and to retain said rod in a given set position.

11. A combination as in claim 6 wherein said arm means is pivoted upon said one of said frame means.

12. In a combination in a harrow construction: rearward and forward frame means carrying earth-working tools; movable draft-actuated lever means on the forward frame means; actuating means connected with and operated by said lever means, said actuating means comprising arm means pivotally mounted upon one of said frame means, link means connecting said lever means to said arm means, and linkage means connecting said arm means to said rearward frame means whereby to elevate the forward portion of the forward frame means with respect to the rearward frame means upon the application of forward draft to said draft-actuated lever means; a horizontal hinge connecting the forward and rearward frame means for relative vertical swinging movement; and ground wheels disposed adjacent said hinge means to support said frame means when respectively elevated by said draft-actuated lever means.

13. A combination as in claim 12 wherein said link means includes a push rod, and said linkage means is a pull linkage attached to said rearward frame means for elevation of one of said frame means with respect to the other upon operation of the push rod by said lever means.

14. A combination as in claim 13 including lock means connected to one of said frame means in position to engage and to retain said push rod in a given set position.

15. In combination in an earth-working device: forward frame means carrying earth-working tools; rearward frame means carrying earth-working tools; ground wheels connected with said frame means for supporting the latter when elevated from the ground; a draw bar; hinge means on said forward frame means and connecting said draw bar to said forward frame means; a riser fixed on said draw bar and having its top extending above said hinge means whereby the top of said riser may swing away from the forward portion of said forward frame means for elevation of said forward portion from the ground; draft-actuated lever means having a pivot mounting upon said top of said riser and connected with said forward portion of said forward frame means; link means connecting said lever means with said rearward frame means to cause said riser top to swing from said forward portion; and means for applying draft to said draft-actuated lever means whereby forward draft applied to said lever means operates through said pivot mounting to swing said top of said riser forward.

16. A combination as in claim 15 including means connected to said forward frame means in position for and adapted for locking connection with said draft-actuated means to lock said draft-actuated means in position to maintain said riser swung away from said forward portion of said forward frame means.

17. A combination as in claim 16 wherein said link means includes rod means connected to and actuable by said draft-actuated lever means and connected to said rearward frame means whereby to lift one of said frame means and its earth-working tools relative to the other, said locking means operating to lock said rod means and maintain said relative elevation.

18. In combination in an earth-working implement: rearward and forward frames each of which is provided with earth-working tools, said frames being arranged in diverging relationship; wheel means carried by one of said frames for relative movement of at least one of said frames with respect thereto; lever means fulcrumed on said forward frame; link means operable by and connected with said lever means and connected with one of said frames and through said one of said frames to said wheel means to elevate at least a portion of one of said frames with respect to the other and said wheel means upon actuation of said lever means, for lifting the most forward earth-working tools from the earth; and draft means connected to said lever means and attachable to a tractive vehicle to actuate said lever means as the vehicle and implement turn toward the side of said most forward tools.

19. A combination as in claim 18 wherein said forward frame includes a draw bar pivotally attached thereto and adapted for attachment to said vehicle.

20. A combination as in claim 19 including: a riser on said draw bar above the pivotal attachment of said draw bar to said frame means, said lever means having connection with the top of said riser whereby the latter is tipped forward by said lever means upon pull by said draft means.

21. In combination in a disk harrow: a front frame carrying a forward gang of disks; a rear frame carrying a rearward gang of disks and operatively connected with said front frame in diverging relation to provide on the side of divergence a foremost portion of said front frame and its associated disks; wheel means connected with said frames and with respect to which said frames are adapted to be raised and lowered; a draw bar pivotally mounted on said front frame; tongue means attached to said draw bar to pull said harrow through the medium of said draw bar; upstanding means fixed on said draw bar; lever means having a pivotal connection with the upper portion of said upstanding means, and adapted to be connected by draft means to a tractive vehicle; linkage means movably connecting one of said frames with said wheel means for actuation to produce elevation of a part of one of said frames with respect to said wheel means; and actuating means connected to and operable by said lever means and also connected with said linkage means for actuation of said linkage means to effect movement between said one of said frames and said wheel means to produce said elevation.

22. A combination as in claim 21 wherein a slide is slidably mounted on said front frame, said slide being pivotally connected to said upstanding means and said lever being pivotally mounted on said slide.

23. A combination as in claim 22 wherein said actuating means is a push rod, the combination including guide means for said slide and means for limiting movement of said slide.

24. In combination in an earth-working device: a framework including forward frame means carrying earth-working tools, rearward frame means carrying earth-working tools, and means connecting said forward and rearward frame means; ground wheel means connected with said framework for supporting the same when elevated from the ground; means mounting said ground wheel means on said framework for movement vertically with respect to said framework and including means to effect said vertical movement; a draw bar; hinge means on said forward frame means and connecting said draw bar to said forward frame means; a riser fixedly mounted on and extending upward from said draw bar and having its top extending above said hinge means whereby the top of said riser may swing forwardly away from the forward portion of said forward frame means for elevation of said forward portion from the ground; lever means; a first pivoting means connected with the top of said riser; a second pivoting means connected with said framework, said lever means having operative connection with both said pivoting means for swinging the top of said riser away from said forward frame means upon application of force to said lever means; link means connecting said lever means with said wheel means and a rearward portion of said framework; and means for applying force to said lever means to swing said top of said riser.

25. In combination in an earth-working device: a framework including forward frame means carrying earth-working tools, rearward frame means carrying earth-working tools, and means connecting said forward and rearward frame means; ground wheel means connected with said framework for supporting the same when elevated from the ground; means mounting said ground wheel means on said framework for movement vertically with respect to said framework and including means to effect said vertical movement; a draw bar; hinge means on said forward frame means and connecting said draw bar to said forward frame means; a riser fixedly mounted on and extending upward from said draw bar and having its top extending above said hinge means whereby the top of said riser may swing forwardly away from the forward portion of said forward frame means for elevation of said forward portion from the ground; lever means pivotally mounted on said forward frame and having a pivot connection with said top of said riser for swinging the top of said riser away from said forward frame means upon application of force to said lever means; link means connecting said lever means with said wheel means and a rearward portion of said framework; and means for applying force to said lever means to swing said top of said riser.

RUSSELL T. EVANS.
JOHN H. CLASEN.

REFERENCES CITED

The following references are of record in the file of this patent:

UNITED STATES PATENTS

| Number | Name | Date |
|---|---|---|
| 1,944,275 | Sandeen | Jan. 23, 1934 |
| 2,237,009 | Mitchell | Apr. 1, 1941 |
| 2,297,788 | McGehee | Oct. 6, 1942 |
| 2,320,742 | Newkirk | June 1, 1943 |
| 2,349,257 | Evans et al. | May 23, 1944 |
| 2,356,876 | Newkirk | Aug. 29, 1944 |